INVENTORS
MARK F. ADAMS
RUDOLF A. V. RAFF

BY *Stowell & Stowell*
ATTORNEYS

Feb. 10, 1970  M. F. ADAMS ET AL  3,494,988
METHOD FOR PARTIALLY EXPANDING PLASTIC BEADS IN A ROTATING PAN
Filed Aug. 10, 1967  2 Sheets-Sheet 2
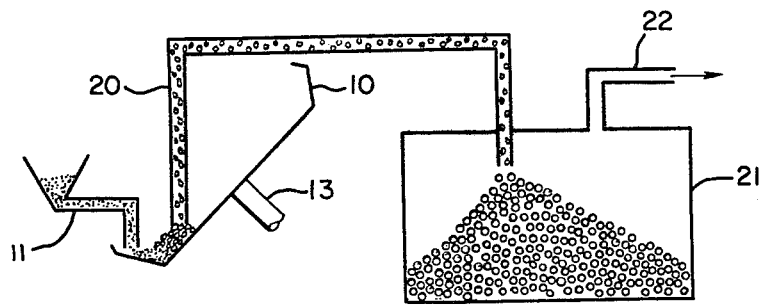
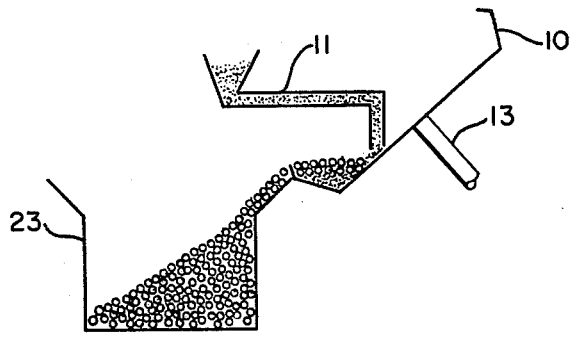
INVENTORS
MARK F. ADAMS
RUDOLF A.V. RAFF
BY *Stowell & Stowell*
ATTORNEYS

3,494,988
METHOD FOR PARTIALLY EXPANDING PLASTIC BEADS IN A ROTATING PAN
Mark F. Adams and Rudolf A. V. Raff, Pullman, Wash., assignors to Research Corporation, New York, N.Y., a non-profit corporation of New York
Filed Aug. 10, 1967, Ser. No. 659,641
Int. Cl. B29d 27/00; B29h 7/20
U.S. Cl. 264—41                                5 Claims

ABSTRACT OF THE DISCLOSURE

Heat-foamable plastic beads are partially expanded by subjecting a body of the beads to a foam-forming temperature in a rotating pan and removing partially expanded beads which segregate, e.g., rise to the surface in the pan. The body of beads in the pan may be heated directly or indirectly through the pan and coloring or other modifying agents may be admixed with the beads in the pan.

---

The invention relates to a method for partially expanding beads of heat-foamable plastic compositions.

Light-weight shaped articles such as containers and toys, and insulating layers in refrigerator and freezer cabinets and in truck and trailer bodies and the like are commonly produced by expanding in situ beads or pellets of plastic compositions having incorporated therein a heat-activated expansion agent. Such plastic compositions may include polystyrene, poly-(alkylstyrenes), poly-(vinyl chloride), poly-(vinylidene chloride), poly-(acrylic and methacrylic esters), copolymers of styrene, alkyl substituted styrenes with each other and with divinylbenzene, butadiene or acrylonitrile and mixtures of such polymers and copolymers. The expanding agent may be a volatile aliphatic or cycloaliphatic hydrocarbon such as petroleum ether, pentane, hexane, heptane, cyclopentane, cyclohexane, cyclopentadiene or mixtures thereof. The expanding agent may constitute from about 3 to about 15% of the bead composition by weight. The heat expandible beads may be round, pillow-shaped or irregular in shape.

Such beads are capable of great expansion and when used directly for the molding may initially occupy less than 10% of the space to be filled. As a result there is a tendency for the expansion of the beads not to be uniform; the material at the top of the mold space, for example, may undergo greater expansion and therefore be less dense than the material in the lower part of the mold space, particularly since the expanded material is a good insulator and tends to insulate still unexpanded material and prevent its complete expansion.

To provide for uniform expansion in the mold space and to produce sharply molded articles, it has been proposed to partially expand the beads outside the mold. The mold is then substantially filled with the partially expanded beads and expansion completed by further heating in the mold.

It has been proposed to pre-expand heat expandible beads by heating them with hot water or steam but these methods require a drying step before the pre-expanded beads can be used.

We have now found that partially expanded beads of heat-expandible plastic compositions can be prepared effectively and economically by subjecting a body of the expandible beads to a foam-forming temperature in a rotating pan whereby the beads as they expand are caused to segregate and removing the segregated partially expanded beads from the pan. An effective apparatus for carrying out the method of the invention is provided by a circular pan rotating about a central axis tilted at an acute angle to the vertical up to 90°, the rate of rotation and angle of tilt being adjusted to cause the partially expanded beads to rise to the top of the body of pellets in the pan.

The method of the invention is particularly adapted for continuous operation, the unexpanded beads being fed into the pan continuously or intermittently at a point spaced from the point of removal of the partially expanded beads. Since the raw beads rapidly sink to the bottom of the body of beads in the pan due to their greater density and the continuous agitation by the rotating pan, no very great separation between the point of feeding raw bead and the point of removing partially expanded beads is required.

The beads may be heated in the pan directly, for example, by means of a bank of radiant heaters suspended above the body of beads in the pan or indirectly, for example, by heating the pan by means of burners or radiant elements below the pan or by means of resistance heating elements embedded in or affixed to the bottom of the pan. The partially expanded beads of predetermined bulk density at the top of the body of beads in the pan may be selectively removed by allowing them to overflow at the pan rim into a collecting drum or launder, by scraping or plowing the partially expanded beads from their segregated position in the pan by means of a suitably positioned baffle or by means of a suction conduit having an inlet opening adjacent the top of the body of beads in the pan.

The conditions of treatment including temperatures, angles of tilt and rates of rotation of the pan may be varied over wide ranges, as will be more particularly set forth hereinafter to produce partially expanded beads of preselected bulk densities. Moreover, coloring agents, such as dyes and pigments, and other conditioning and filling agents may be conveniently added to the beads during the pre-expanding operation and are picked up by the beads as uniformly distributed coatings thereon. This simultaneous and intimate incorporation of additives during the preforming procedure is not possible by known methods of pre-expansion and is considered an especially advantageous feature of the invention.

The principles of the invention will be more particularly set forth with reference to the accompanying drawings wherein:

FIGURE 3 is a diagrammatic representation of a suction arrangement for removing partially expanded beads from the pan of FIG. 1; and FIGURE 4 is a diagrammatic representation of an overflow arrangement for removing partially expanded beads from the pan of FIG. 1.

In the figures, 10 is a circular pan mounted for rotation about an axis adjustably positionable at any desired acute angle to the vertical and 11 is a feed pipe for supplying unexpanded plastic beads to the pan.

Figure 1:
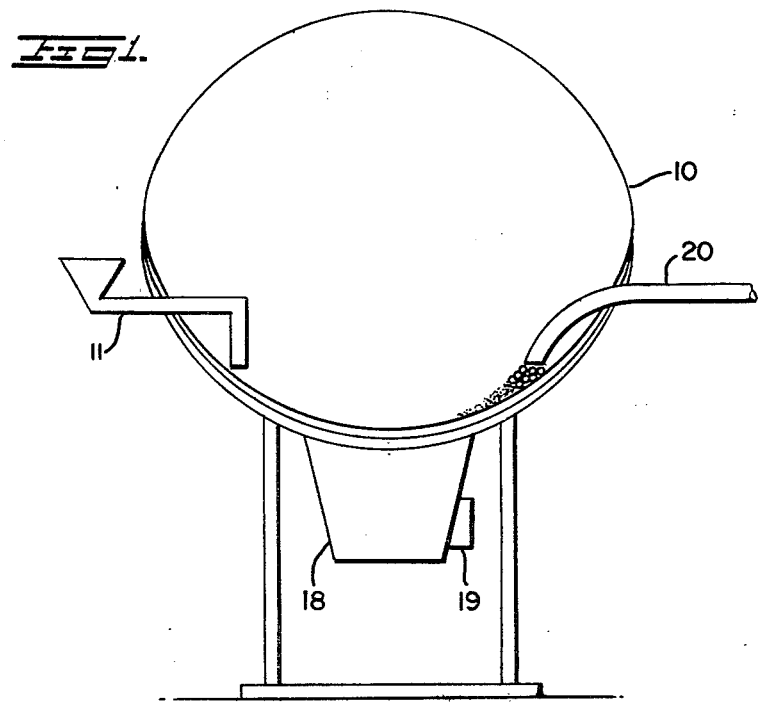
FIGURE 1 is a front elevation of a rotating heatable pan suitable for carrying out the method of the invention.
Figure 2:
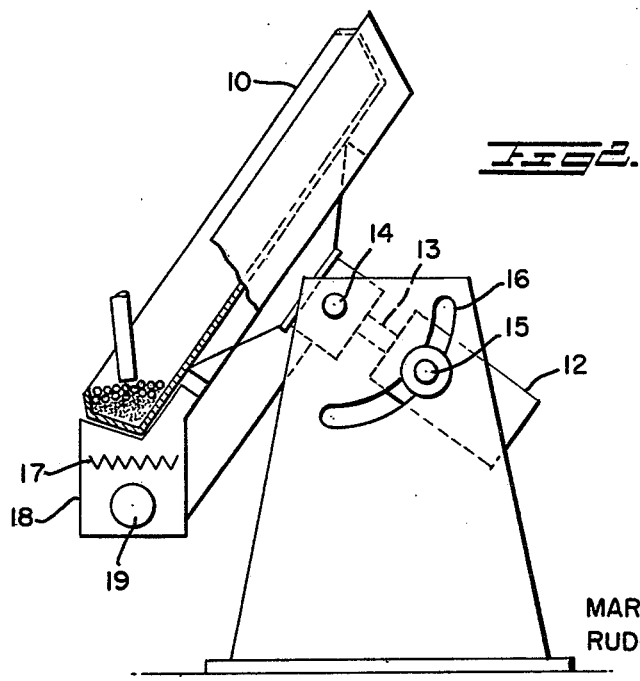
FIGURE 2 is a side elevation of the apparatus of FIG. 1 with parts broken away.

Referring more particularly to FIGS. 1 and 2, 12 is a variable drive motor rotating pan 10 through axle 13. The position of the pan and drive assembly can be adjusted to various angles about pin 14 by means of pins 15 sliding in arcuate slot 16. Pan 10 is heated by means of thermostatically controlled heating coils 17 in plenum chamber 18 through which a current of air can be blown by blower 19 to provide a more uniform distribution of heat.

Pipe 20 is the suction end of a suction pick-up arrangement which, as shown in FIG. 2, includes a catchbox 21 which is connected by pipe 22 to a suction pump (not shown). It is desirable to provide means for adjusting the position of the pick-up end of the pipe 20 adjacent the segregated position of the partially expanded beads in the pan.

FIGURE 4 shows an alternative arrangement in which the partially expanded beads overflow from the rim of the pan into box 23.

Stationary rakes or scraper members may be positioned adjacent the bottom of the band between the feed point and the take-off point to increase the agitation of the beads and to reduce sticking of the beads to the pan. Sticking of the beads may also be reduced or prevented by coating the surface of the pan as well as any rakes, scrapers or baffles containing the beads with a non-sticking plastic coating such as Teflon (polytetrafluoroethylene).

The following table shows the results obtained by partially expanding commercial foamable polystyrene beads (Koppers Company's Dylite KFP–164A) having a bulk density of 37.4 lbs./cu. ft. in apparatus for the type shown in the drawings under various conditions of operation:

| Run No. | Angle of axis with vertical (°) | Temperature in pan (° F.) | Peripheral speed of pan (ft./min.) | Expanded bead density (lbs./cu. ft.) |
|---|---|---|---|---|
| 1 | 16 | 190 | 11.3 | 7.5 |
| 2 | 16 | 190 | 4.25 | 4.9 |
| 3 | 16 | 210 | 4.25 | 2.9 |
| 4 | 16 | 230 | 4.25 | 2.2 |
| 5 | 45 | 190 | 11.3 | 4.3 |

It will be noted that a range of expanded densities of over three-fold was obtained. Runs 1 and 2 illustrate the effect of varying speeds of pan rotation of the expanded density; runs 2, 3 and 4 illustrate the effect of varying temperatures, and runs 1 and 5 illustrate the effects of varying angles of the axis of rotation.

The conditions of operation can be readily adjusted to adopt the operation to foamable beads of varying compositions to produce pre-expanded beads of a wide range of bulk densities. There is a high degree of inherent self-regulation in the method because the lower in density and the greater in size the individual beads become the more rapidly the rise to the top of the body of beads in the pan and the more rapidly they are removed by overflow or suction.

We claim:
1. A method of converting beads of heat-foamable plastic compositions to beads of substantially decreased bulk density which comprises subjecting a body of the beads to a foaming temperature while subjecting the beads to agitation in a rotating pan whereby the beads, as they expand, are caused to segregate and removing the segregated partially expanded beads from the pan.

2. A method as defined in claim 1 wherein the partially expanded beads are caused to overflow the rim of the pan.

3. A method as defined in claim 1 wherein the partially expended beads are removed from their segregated position in the pan by suction.

4. A method as defined in claim 1 wherein unexpanded beads are continuously supplied to the body of beads at position spaced from the position at which the partially expanded beads segregate and the partially expanded beads are removed at the latter position at the same rate as the rate of supply of the unexpanded beads.

5. A method as defined in claim 1 wherein the angle of the axis of rotation of the pan, the rate of rotation of the pan and the temperature in the pan are mutually adjusted to produce partially expanded beads having a preselected bulk density substantially less than the bulk density of the unexpanded beads.

References Cited

UNITED STATES PATENTS

| 2,939,172 | 6/1960 | Von Reppert. |
| 3,015,479 | 1/1962 | Edberg et al. |
| 3,206,528 | 9/1965 | Coombs et al. |
| 3,207,820 | 9/1965 | Scarvelis et al. |

OTHER REFERENCES

Koppers Co. "Technical Manual Dylite Expandable Polystyrene: Storage and Transfer of Pre-Expanded Beads," Bulletin C–9–273, Chaper 3c, Nov. 15, 1959 (all pages).

PHILIP E. ANDERSON, Primary Examiner

U.S. Cl. XR

18—1; 263—21; 264—53, 345